US005853246A

United States Patent [19]
Lowder

[11] Patent Number: 5,853,246
[45] Date of Patent: Dec. 29, 1998

[54] WET-BULB THERMOMETER

[76] Inventor: Val Lowder, 294 E. 50 North, Smithfield, Utah 84335

[21] Appl. No.: 384,968

[22] Filed: Feb. 6, 1995

[51] Int. Cl.[6] .......................... G01K 13/00; G01K 13/02

[52] U.S. Cl. ....................................... 374/109; 73/335.08

[58] Field of Search .................................... 327/534, 536, 327/537, 77, 78, 82, 538, 543, 545, 80, 81, 535, 546; 323/315, 316, 312; 365/226, 189.09; 374/109; 73/335.06, 335.07, 335.08, 335.09

[56] References Cited

U.S. PATENT DOCUMENTS

| | | | |
|---|---|---|---|
| 1,228,718 | 6/1917 | Thompson et al. | 73/335.08 |
| 3,855,863 | 12/1974 | Kuehn et al. | 374/109 |
| 4,240,265 | 12/1980 | Faxon | 62/171 |
| 4,592,661 | 6/1986 | Wilson | 374/109 |
| 4,730,462 | 3/1988 | Rogers | 62/171 |
| 4,770,040 | 9/1988 | Hooper et al. | 73/335.02 |
| 5,148,710 | 9/1992 | Gudehus et al. | 73/335.06 |
| 5,460,041 | 10/1995 | Andes et al. | 73/335.08 |

*Primary Examiner*—Diego F.F. Gutierrez
*Attorney, Agent, or Firm*—Thompson E. Fehr

[57] ABSTRACT

A wet bulb thermometer. A temperature sensor which can function in a moist environment is placed in such a location that it will be within the mist of water produced by a nozzle when pressurized water is supplied to the nozzle. Preferably, the temperature sensor is placed somewhat below the nozzle to account for the effect of gravity upon the mist of water. Also, preferably, the temperature sensor produces an electrical signal that is indicative of temperature and that can be read by a computer. Accuracy of the determination of the wet-bulb temperature of the air is assured by the redundancy of this device. Evaporation from droplets in the mist assure that the temperature of the air within the mist is at the wet-bulb temperature as, independently, does the evaporation from the film of water which forms on the surface of the temperature sensor. Avoiding confining the spray and conducting liquid water from a reservoir to the temperature sensor eliminates potential external sources of heat which could prevent an accurate determination of the wet-bulb temperature.

3 Claims, 1 Drawing Sheet

WET-BULB THERMOMETER

BACKGROUND OF THE INVENTION FIELD

1. Field of the Invention

This invention relates to a device for measuring wet-bulb temperature.

2. Description of the Related Art

*The Encyclopedia of Atmospheric Sciences and Astrogeology*, which is published by Reinhold Publishing Corporation and was copyrighted in 1967, defines adiabatic wet-bulb temperature, or pseudo-wet-bulb temperature, as ". . . the temperature . . . at which pure water must be evaporated into a given sample or parcel of air, adiabatically and at constant pressure, in order to saturate the air . . . [with water vapor]." This encyclopedia further mentions that such adiabatic wet-bulb temperature ". . . may be obtained from a thermodynamic diagram . . . "

And the encyclopedia additionally provides:

The temperature which will be reached by the given sample of air if it is cooled at constant pressure by evaporating water into it until it is saturated, the latent heat necessary being taken from the sample of air only, is sometimes called the isobaric wet-bulb temperature.

In the *McGraw-Hill Encyclopedia of Science & Technology*, which is quite logically published by McGraw-Hill, Inc. and which was last copyrighted in 1992, a psychrometer is defined as:

An instrument consisting of two thermometers which is used in the measurement of the moisture content of air or other gases. The bulb or sensing area of one of the thermometers either is covered by a thin piece of clean muslin cloth wetted uniformly with distilled water or is otherwise coated with a film of distilled water. The temperatures of both the bulb and the air contacting the bulb are lowered by the evaporation which takes place when unsaturated air moves past the wetted bulb. An equilibrium temperature, termed the wet-bulb temperature . . . , will be reached; it closely approaches the lowest temperature to which air can be cooled by the evaporation of water into that air . . .

. . . [M]oisture parameters, such as relative humidity and dew-point temperature, can be conveniently evaluated from the wet- and dry-bulb measurements by means of psychrometric tables.

Despite the fact that the *McGraw-Hill Encyclopedia of Science & Technology* mentions that bulb of the wet-bulb thermometer ". . . either is covered by a thin piece of clean muslin cloth wetted uniformly with distilled water or is otherwise coated with a film of distilled water," such encyclopedia describes no such other method of coating the bulb with a film of distilled water.

Four United States patents discuss methods of wetting the bulb of a wet-bulb thermometer.

U.S. Pat. No. 3,495,458 of Kenneth M. Christensen utilizes a psychrometer with a wet-bulb thermometer which includes the ". . . usual moisture containing wick," i.e., ". . . a thermometer having a porous wick element placed over its end with a water reservoir connected to the wick for keeping the bulb of the thermometer wet at all times."

In U.S. Pat. No. 5,148,710 of Hans C. Gudehus et al. ". . . the initially dry wet-temperature sensor is moistened by the stream of gas [the wet-bulb temperature of which is to be measured] itself and therefore not by a supply of extraneous liquid. To accomplish this, the temperature sensor itself is cooled to begin with."

A rather complicated device is described in U.S. Pat. No. 4,770,040 of Edmund M. Hooper et al. for "the detection of humidity of a hot gas stream." This device has ". . . a liquid coolant supply tube which terminates in a spray nozzle for spraying a fine mist of cool liquid such as water to thoroughly soak . . . [a] porous cap. As the cap absorbs the water there is a temperature drop which is sensed by a temperature detector mounted to the cap."

. . . At the start of operation cap 22 is at the temperature of the air in the dryer duct. Spray nozzle 26 is then turned on and the inside of cap 22, which is in the form of a cylinder having a closed outer end, is blasted with a fine mist of cool water. When cap 22 has been cooled sufficiently below the wet bulb temperature and has become thoroughly soaked the spray is turned off. The hot air of the duct impinges on cap 22 heating it in a classical exponential temperature vs. time curve until cap 22 passes the wet bulb temperature of the air in the duct. At that point the water absorbed in the porous cap starts evaporating and holds the temperature of the cap constant. This is followed by a slight depression in the cap temperature. The lowest point of this depression is taken as the wet bulb temperature. After the water in the cap has sufficiently evaporated then begins a second exponential climb in temperature. Using the wet bulb temperature of the air in the duct as given by the minimum temperature of the cap during the depression stage and the dry bulb temperature of the duct air, plus a program using psychrometric equations, the absolute humidity of the duct air is obtained.

A spray of water is also employed in U.S. Pat. No. 1,228,718 of Albert W. Thompson et al. The spray is discharged into a chamber to supersaturate the air in such enclosure with water vapor. Liquid water is subsequently precipitated from this supersaturated air when such air encounters the wall of the chamber. The liquid water accumulates in a trough and is then conducted by a tube or rod to the wet-bulb member where it coats the surface of such wet bulb member and has a current of air pass over it.

This last invention has, however, at least two problems. It is possible that some of the liquid water will be produced by condensation. If so, the latent heat of evaporation for such water will be released and raise the temperature of the water which accumulates in the chamber above the wet-bulb temperature of the air. And it is even more likely that heat will be transferred to the liquid water through the trough as the water accumulates and through the tube or rod as the liquid water is conducted to the surface of the wet-bulb member.

An accurate reading will, though, be provided by the invention of this last patent because the current of air passing over the liquid water which coats the surface of the wet-bulb member will cause the air in the vicinity of the wet-bulb member and the liquid water coating the surface of the wet-bulb member to be at the wet-bulb temperature of the air.

SUMMARY OF THE INVENTION

The theoretical basis for the present invention is the realization that using a nozzle to create a mist of water in the air will cause the air within the mist to be at the wet-bulb temperature for such air; that leaving the mist unconfined in the atmosphere will eliminate the risk of producing heat by the condensation of water vapor; and that placing a temperature sensor within such mist will allow such sensor to measure the wet-bulb temperature accurately since water will only accumulate in a film on the surface of the temperature sensor and will, therefore, not have heat conducted to it from external sources.

Requiring only a nozzle for connection to a source of water and a temperature sensor, the construction and operation of the present wet-bulb thermometer are considerably simpler than in the case of the prior patents.

Furthermore, it should be noted that in order to form a mist, the air whose wet-bulb temperature is being measured should be relatively still because otherwise the mist would not be produced.

DESCRIPTION OF THE PREFERRED EMBODIMENT

Figure 1:
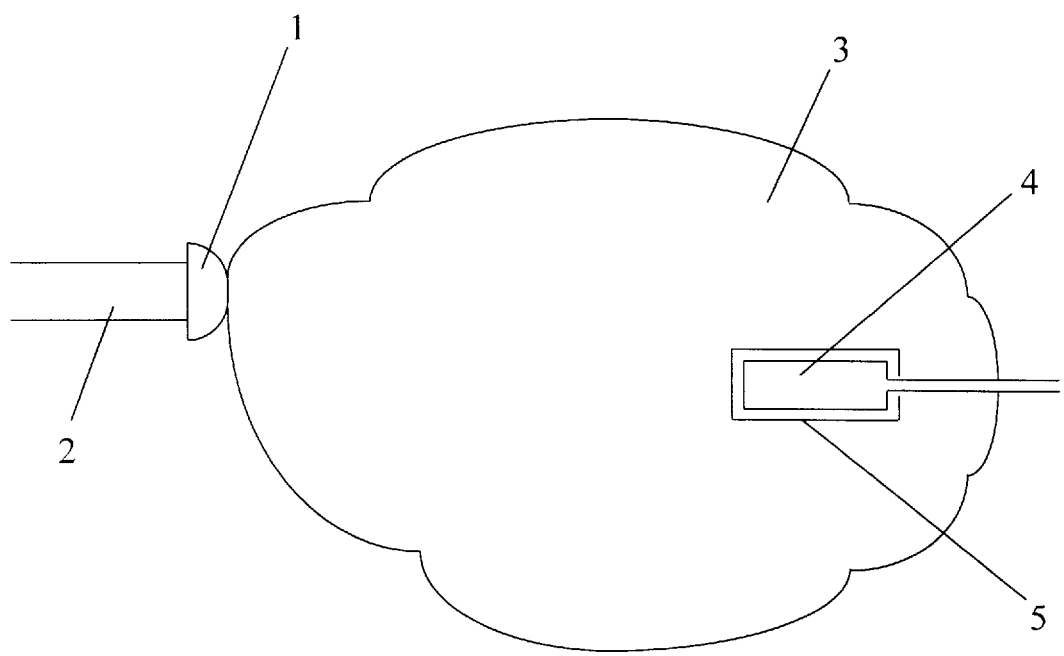
FIG. 1 depicts the wet-bulb thermometer of the present invention.

The wet-bulb thermometer has a nozzle 1 for connection to a source of pressurized water such as a pipe 2. When water is conducted through the pipe 2 to the nozzle 1, the nozzle 1 will produce a mist of water 3.

Having a mist of water 3 assures that the droplets of water within such mist of water 3 will be small and, consequently, have a large surface area in comparison to their volume. This encourages evaporation of the water and, thus, guarantees that the air within the mist will be at the wet-bulb temperature of such air.

A temperature sensor 4 is placed with respect to the nozzle in such a position as to assure that the temperature sensor 4 will be within the mist of water 3 and, therefore, accurately measure the wet-bulb temperature of the air. of course, this requires that the temperature sensor 4 be capable of functioning in a moist environment, as are both the traditional thermometer and a variety of electronic sensors that determine temperature.

Some water tends to accumulate in a film 5 on the surface of the temperature sensor 4. This film of water 5, however, continuously evaporates and is replenished and would, therefore, even in the absence of evaporation from the mist of water 3, cause the temperature sensor 4 to give the wet-bulb temperature of the air.

The construction of this wet-bulb thermometer, thus, includes a redundancy which simply increases the reliability of the measurement of wet-bulb temperature and does so without creating the substantial possibility of introducing external heat into the device.

Furthermore, unlike the invention of U.S. Pat. No. 4,770,040, the present invention operates continuously, not requiring the supply of water to the nozzle 1 periodically to be terminated. The readings produced by the present invention will, thus, also be continuous.

Preferably, the temperature sensor 4 of the wet-bulb thermometer will be located somewhat below the nozzle 1 to account for the effect of gravity upon the mist of water 3 and guarantee that the temperature sensor 4 will, indeed, be located well within the mist of water 3.

Also, the temperature sensor 4 will preferably be of the type which is well known in the art and which produces an electrical signal that is indicative of temperature and that can be read by a computer.

Such a computer can be programmed with a psychrometric table and, therefore, when also supplied with the dry-bulb temperature of the air, determine both the relative humidity and the dew point for the air. These values (of relative humidity and dew point) can either be visually displayed or utilized with a device to control relative humidity and dew point within an enclosed environment.

Of course, the temperature sensor 4 could also simply provide a direct visual display of the wet-bulb temperature. If desired, an individual can then use this information, together with the dry-bulb temperature of the air which would be obtained from a standard thermometer or other standard temperature sensing device, and determine the relative humidity and dew point from a psychrometric table.

I claim:

1. A process for determining the wet-bulb temperature of relatively still air, which comprises:

passing pressurized water through a nozzle to produce a mist of water in the air the wet-bulb temperature of which is to be determined;

placing a temperature sensor, with respect to said nozzle, in such a position as to assure that said temperature sensor will be within the mist of water produced by the nozzle; and measuring the temperature of the air within the mist of water with the temperature sensor, said measured temperature corresponding to the wet-bulb temperature of the air.

2. A wet-bulb thermometer, which comprises:

a nozzle for connection to a source of pressurized water so that when such pressurized water is conducted to said nozzle, said nozzle will produce a continuous, unconfined mist of water in the air the wet-bulb temperature of which is to be determined; and a temperature sensor to measure air temperature during the production of the mist, said temperature sensor having been placed, with respect to said nozzle, in such a position as to assure that said temperature sensor will be within the mist of water produced by the nozzle so that the air around the temperature sensor will be air that is completely saturated with water vapor and that the temperature measured by the sensor will, therefore, be the wet-bulb temperature of such air and said temperature sensor being capable of accumulating water only in a film on the surface of said temperature sensor so that heat will not be conducted to such water from external sources, wherein the temperature sensor is entirely located somewhat below the nozzle to account for the effect of gravity upon the mist of water.

3. The wet-bulb thermometer as recited in claim 2, wherein:

the temperature sensor produces an electrical signal that is indicative of temperature and that can be read by a computer.

* * * * *